United States Patent
Vrudny et al.

(10) Patent No.: US 6,347,882 B1
(45) Date of Patent: Feb. 19, 2002

(54) DISPLAY BACKLIGHTING SYSTEM

(75) Inventors: Stephan Vrudny, Grayslake; John C. Byrne, Lake Villa, both of IL (US)

(73) Assignee: Motorola, Inc., Schaumburg, IL (US)

( * ) Notice: Subject to any disclaimer, the term of this patent is extended or adjusted under 35 U.S.C. 154(b) by 21 days.

(21) Appl. No.: 09/640,296

(22) Filed: Aug. 16, 2000

(51) Int. Cl.[7] .................................................. F21V 7/04
(52) U.S. Cl. ........................ 362/561; 362/27; 362/31; 349/65; 385/146
(58) Field of Search .............................. 362/26, 27, 31, 362/511, 489, 561; 349/65; 385/146

(56) References Cited

U.S. PATENT DOCUMENTS 5,465,193 A * 11/1995 Tracy ........................... 362/31
5,669,693 A * 9/1997 Smith .......................... 362/31

* cited by examiner

Primary Examiner—Stephen Husar
(74) Attorney, Agent, or Firm—Michael C. Soldner

(57) ABSTRACT

A display back lighting system (100) includes a light pipe (106) that is mounted above a printed circuit board (102) and below a liquid crystal display (108). The backplane (112) of the light pipe has a surface area adapted to accommodate the liquid crystal display. The backplane of the light pipe is substantially perpendicular to a light emitted from a light source (104) mounted on the printed circuit board. An entrance lens (114) on the light pipe receives light from the light source and directs the light towards a reflecting lens (116). The reflecting lens optimally has an elliptical shape that reflects light from the entrance lens toward the backplane of the light pipe. In this manner, a backlight is provided for a liquid crystal display.

20 Claims, 1 Drawing Sheet

DISPLAY BACKLIGHTING SYSTEM

FIELD OF THE INVENTION

The present invention relates generally to display backlighting systems, and in particular, to a display backlighting system for illuminating a liquid crystal display in a portable electronics device, such as a wireless telephone.

BACKGROUND OF THE INVENTION

Liquid crystal displays (LCD) and other displays are used in many electronic devices, including portable electronic devices. In many electronic devices employing liquid crystal and other displays, the display is illuminated to facilitate better perception by a user. One common way of illuminating a display is to backlight the display. Typically, the goal of backlighting is to route light from a source efficiently and evenly into the planer area (backplane) of a light pipe directly behind the LCD so that it may escape forward through the LCD, giving the appearance of an illuminated display. Backlighting requires that light from the light source be emitted into an entrance lens of the light pipe and distributed evenly within the light pipe.

Various techniques known to those of skill in the art are used to evenly distribute the light within the light pipe. In a portable electronic device employing display backlighting, the light source is mounted to a printed circuit board (PCB), upon which other components implementing the function of the electronic device are also mounted. A typical light source for backlighting a display consists of one or more light emitting diodes (LEDs). Two types of LEDs, top firing LEDs and side firing LEDs are normally used. Top firing LEDs emit light generally perpendicular to the mounting surface of the printed circuit board, while side firing LEDs emit light in an area generally parallel to the mounting surface of the printed circuit board.

In portable electronic devices in which the size of the device is optimally small, the LCD is mounted with the readable surface of the display being approximately parallel to the PCB. In this arrangement, side firing LEDs generally offer increased optical efficiency due to their ability to emit light parallel to and directly into the light pipe backplane. However, the use of side firing LEDs requires positioning the backplane of the light pipe at the same level as the LED and very close to the surface of the PCB. This arrangement of the LED is problematic, in that having to place the backplane of the light pipe at a close proximity to the PCB corrupts the ability to place PCB mounted electrical components in the area on the PCB taken up by the flat light pipe.

Therefore a need exists for a display backlighting system that provides sufficient illumination for a display without consuming areas of the PCB that could otherwise be populated with critically needed electronic components.

DETAILED DESCRIPTION OF THE PREFERRED EMBODIMENTS

A display backlighting system according to the present invention includes a light pipe of novel configuration mounted above a light source. Preferably, the source is a light emitting diode mounted on a printed circuit board. A liquid crystal display rests on a surface of the light pipe to thereby receive illumination from the light pipe. The light pipe has an entrance lens that is placed above the light source. Opposite the entrance lens is a reflecting lens that directs light from the light source generally throughout the light pipe. A backplane, or channel of the light pipe runs substantially perpendicular to the primary angle of illumination from the light source. Preferably, the reflecting lens is circular, or arcuate in cross section, to maximize the amount of light reflected down the backplane of the light pipe. Most preferably, the reflecting lens is elliptical in cross section.

Figure 1:
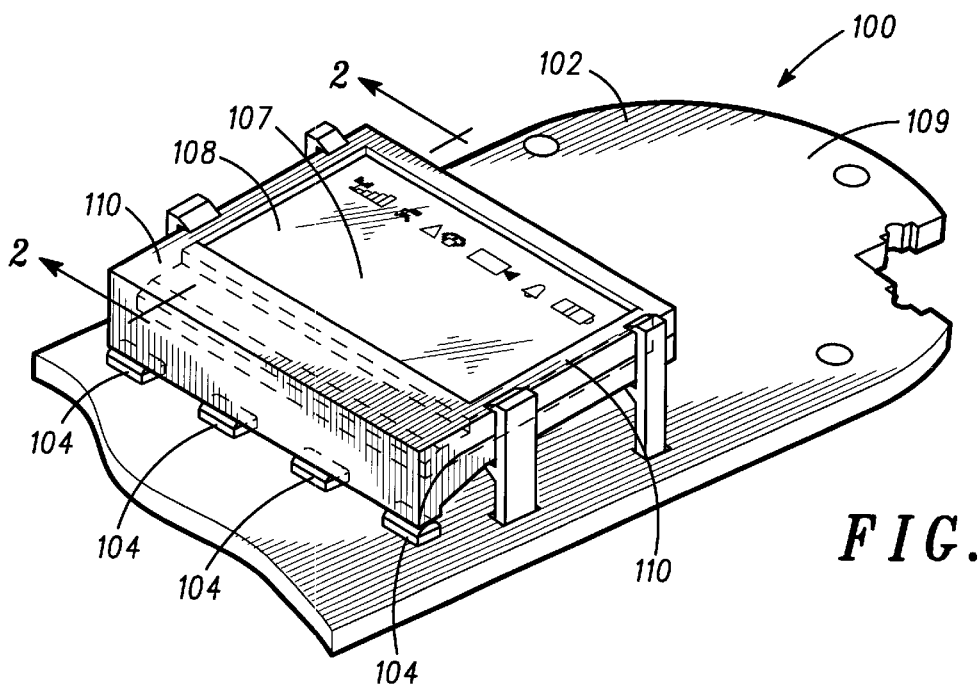
FIG. 1 is a top elevation view of a portion of a wireless telephone with a display backlighting system in accordance with the present invention.

FIG. 1 illustrates a preferred embodiment of a display backlighting system in accordance with the present invention. The display backlighting system shown in FIG. 1 is integrated into a cellular telephone 100. Cellular telephone 100 includes a printed circuit board 102, which holds components that implement the functionality of the telephone. A liquid crystal display 1 08 is positioned within a metal housing 110, and has a display surface area 107 that is approximately parallel to a mounting surface area 109 of printed circuit board 102. The display surface area 107 of the liquid crystal display 108 is illuminated by a light source 104 mounted on printed circuit board 102.

Figure 2:
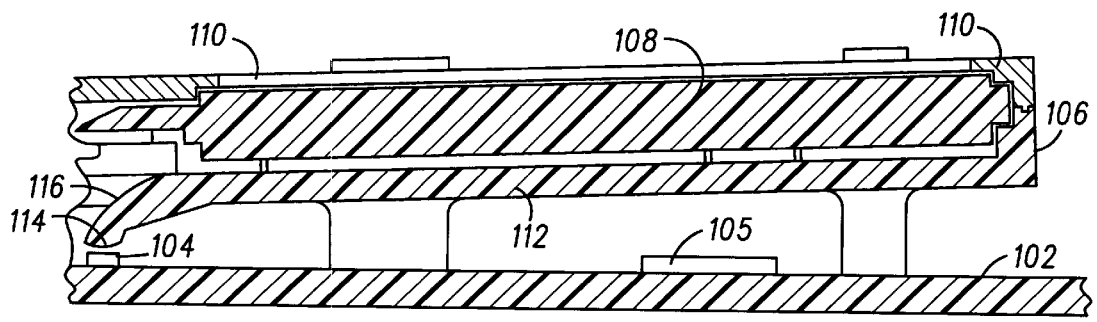
FIG. 2 is a cross sectional view of the display backlighting system shown in FIG. 1 taken along section line 2—2.

FIG. 2 is a cross sectional view of cellular telephone 100 taken along section line 2—2 of FIG. 1. FIG. 2 shows a cross section of the display backlighting system in accordance with the present invention. Referring to FIG. 1 and FIG. 2, in addition to light source 104, additional electrical components 105 are also mounted on printed circuit board 102. While only a single electrical component 105 is shown, it is understood that printed circuit board 102 includes any number of electrical components mounted thereon. A light pipe 106 is mounted above printed circuit board 102 and below liquid crystal display 108 to illuminate liquid crystal display 108. Metal housing 110 holds liquid crystal display 108 and light pipe 106 together.

Light pipe 106 has a generally rectangular configuration and is formed from an optical grade of plastic. Light pipe 106 is sized to coincide with the display surface area 107 of liquid crystal display 108 that is to be illuminated. Light pipe 106 has a backplane 112 that substantially coincides with the display surface area 107 to be illuminated. An entrance lens 114, located at one end of light pipe 106, is adapted to receive light from light source 104. A reflecting lens 116 is formed in light pipe 106 opposite entrance lens 114 in a manner to receive light from light source 104 after the light passes entrance lens 114. In accordance with the present invention, reflecting lens 116 is configured to optimally reflect light from light source 104 down backplane 112 of light pipe 106.

Figure 3:
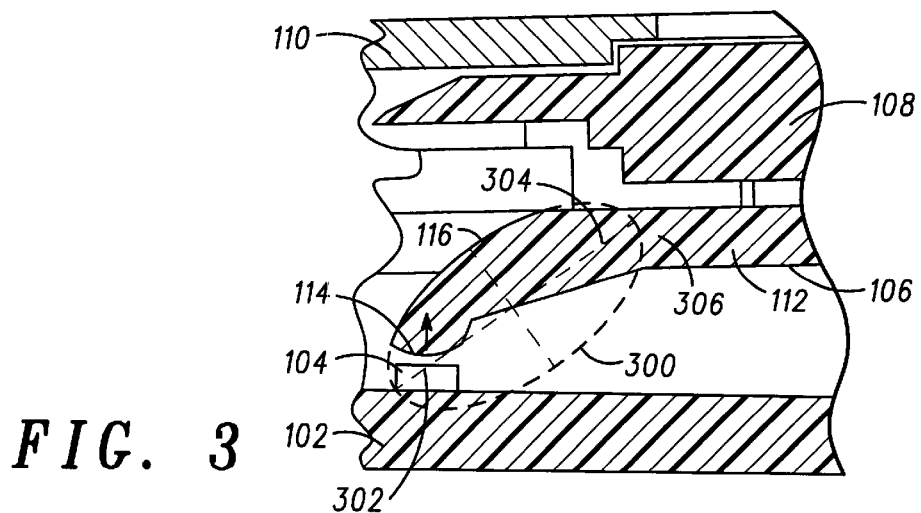
FIG. 3 is an enlarged view of a portion of the cross section shown in FIG. 2.

In particular, as illustrated in FIG. 3, according to the present invention, reflecting lens 116 is preferably formed as a portion of an ellipse 300 (shown in phantom) so that a cross section of the reflecting lens 116 is coincident with the ellipse 300, and reflecting lens 116 forms a portion of the ellipse 300. Alternatively, according to the present invention, the surface of reflecting lens 116 may also be curved, arcuate, circular or a spline.

Most preferably, light source 104 is placed as shown in FIG. 3 such that a focal point 302 of ellipse 300 is coincident with, or aligned with light source 104. In addition, light pipe 106 is formed so that an entrance point 306 to the backplane 112 of the light pipe 106 is coincident with, or aligned with an opposite focal point 304 of the ellipse 300. This arrangement capitalizes on the reflective property of the ellipse whereby light rays originating at one focal point of the ellipse converge at the opposite focal point, after reflecting off the curved boundary of the ellipse. In particular, according to the present invention, light rays from light source 104 that are generated at the focal point 302 of the ellipse 300 strike the portion of the reflecting lens 116 coincident with the ellipse 300, and are reflected by reflecting lens 116 so that the reflected rays converge at the opposite focal point 304 of the ellipse 300.

In this way, according to the present invention, focal point 302 of ellipse 300 is aligned with the light source 104, and focal point 304 of ellipse 300 is aligned with the entrance point 306 to the backplane 112 of the light pipe 106 so that the light is directed, the direction indicated by arrow 115, from the light source 104 to the reflecting lens 116, and the reflected light from the reflecting lens 116 then converges at the entrance of the backplane 112 of the light pipe 106. In this manner, light from light source 104 is directed to reflecting lens 116 through entrance lens 114, and the light reflected off reflecting lens 116 then converges at focal point 304, which coincides with the entry point 306 into backplane 112 of light pipe 106. Accordingly, the present invention enables light from the light source 104 to be more efficiently and evenly routed into the backplane 112 of the light pipe 106.

Light source 104 is preferably a top firing LED. Entrance lens 114 is preferably convex in shape to narrow the beam of light from light source 104. Alternatively, for purpose of reduced manufacturing cost, the surface of entrance lens 114 may be flat and approximately parallel with the PCB. As discussed above, reflecting lens 116 is preferably elliptical in shape, although other curved or circular shapes or splines are alternatively used.

By virtue of the present invention, a light pipe is configured to rest above a printed circuit board, allowing for components to be placed on the printed circuit board in an area below the light pipe. Light from a light source that shines substantially perpendicular to and away from the printed circuit board is reflected into the light pipe to concentrate light down a backplane running somewhat parallel to the liquid crystal display. As a result, the light pipe of the present invention provides sufficient illumination for a display while optimizing component space for a portable device.

Whereas the present invention has been described with respect to specific embodiments thereof, it will be understood that various changes and modifications will be suggested to one skilled in the art. For example, while the present invention is described as being integrated within a cellular telephone, it is understood that the present invention could be integrated within any display backlighting system. It is intended that the invention encompass such changes and modifications as fall within the scope of the appended claims.

What is claimed is:

1. A display backlighting system, comprising:
 a light pipe having an entrance lens, a reflecting lens, and a backplane;
 a liquid crystal display mounted above the light pipe and having a display surface area; and
 a light source mounted below the light pipe, wherein the entrance lens is positioned to receive light directed from the light source substantially perpendicular to and towards the liquid crystal display, and wherein the reflecting lens is positioned to receive the light from the entrance lens and to reflect the light down the backplane and parallel to the liquid crystal display.

2. The display backlighting system of claim 1, wherein a surface of the reflecting lens is arcuate.

3. The display backlighting system of claim 2, wherein the surface of the reflecting lens forms a portion of an ellipse.

4. The display backlighting system of claim 3, wherein a first focal point of the ellipse is coincident with the light source and a second focal point of the ellipse, opposite the first focal point, coincides with an entry point of the backplane, and light rays generated at the first focal point are reflected to converge at the second focal point.

5. The display backlighting system of claim 1, wherein the light pipe is formed from an optical grade of plastic.

6. The display backlighting system of claim 5, wherein the light pipe is generally rectangular.

7. The display backlighting system of claim 1, wherein the light pipe is mounted above a printed circuit board and below the liquid crystal display.

8. The display backlighting system of claim 7, wherein the entrance lens is flat and approximately parallel to the printed circuit board.

9. The display backlighting system of claim 8, wherein the display surface area of the liquid crystal display is parallel to a mounting surface area of the printed circuit board.

10. The display backlighting system of claim 1, wherein the entrance lens is convex.

11. The display backlighting system of claim 1, wherein the backplane is parallel to the display surface area of the liquid crystal display.

12. The display backlighting system of claim 1, wherein the light source is a top firing light emitting diode.

13. A light pipe for directing light from a light source to illuminate a display surface area of a display, comprising:
 a backplane having an entry point, the backplane substantially coinciding with the display surface area;
 an entrance lens, positioned at a first end of the light pipe, receiving light from the light source; and
 a reflecting lens, positioned opposite the entrance lens, receiving light passing through the entrance lens and reflecting the received light down the backplane, wherein the reflecting lens is formed as a portion of an ellipse.

14. The light pipe of claim 13, wherein a first focal point of the ellipse is coincident with the light source and a second focal point of the ellipse, opposite the first focal point, coincides with the entry point of the backplane, and light received at the first focal point is reflected to converge at the second focal point.

15. The light pipe of claim 14, wherein the light pipe is generally rectangular and is formed from an optical grade of plastic.

16. The light pipe of claim 15, wherein the light pipe is sized to coincide with the display surface area.

17. The light pipe of claim 16, wherein the light source is a top firing light emitting diode.

18. The light pipe of claim 17, wherein the entrance lens is convex.

19. The light pipe of claim 17, wherein the entrance lens is flat and approximately parallel to the printed circuit board.

20. A light pipe of an electronic device, comprising:
 means for receiving light from a light source at a first focal point coincident with the light source; and
 means for reflecting the received light to converge at a second focal point coinciding with an entry point into a backplane of the light pipe.

* * * * *